Patented May 27, 1941

2,243,519

UNITED STATES PATENT OFFICE 2,243,519

ASPHALT EMULSION AND METHOD OF PREPARING SAME

Edwin J. Barth, Chicago, Ill., assignor to Sinclair Refining Company, New York, N. Y., a corporation of Maine No Drawing. Application January 6, 1937, Serial No. 119,269

6 Claims. (Cl. 134—1)

This invention relates to asphalt emulsions and methods of preparing them.

The emulsions of the invention comprise substantially homogeneous dispersions of asphalt in an aqueous medium, an emulsifying agent consisting of a water-soluble sodium soap of an organic acid produced by the oxidation of hydrocarbons of intermediate molecular weight, such as paraffin wax, and a precipitated inorganic stabilizing agent, such as an hydroxide of a metal selected from the group consisting of aluminum, copper, iron and lead. The rapid-breaking emulsions of the present invention are stable and thoroughly miscible with water and therefore may be diluted to substantially any desired degree of fluidity.

The process of the invention is characterized by the fact that both inorganic stabilizing agents and emulsifying agents eventually embodied in the finished emulsion are formed by reaction between the substances used in the preparation of the emulsion. In its broadest aspect the process of the invention comprises melting the asphalt to be emulsified and then admixing with the molten asphalt, while it is being subjected to active agitation, the products resulting from the reaction of a concentrated aqueous solution of sodium hydroxide and a metallic soap of an organic acid produced by the oxidation of hydrocarbons of intermediate molecular weight. As soon as the asphalt has been well incorporated into the mass, additional water may be added until the mass is reduced to the desired fluidity.

The metallic soaps useful in carrying out the process of the present invention, in the production of the improved emulsions of the invention, are soaps of metals selected from the group consisting of aluminum, iron, copper and lead. These soaps may advantageously be soaps of the wax acids produced by the oxidation of paraffin wax, although soaps of wax acids produced by the oxidation of other materials such as ceresin, slopwax, non-viscous neutral oils and gas oils are also useful. The aluminum soap of wax acids derived from the oxidation of paraffin wax having a melting point of 130–132° F. is quite soluble in asphalt and I have found this substance to be particularly useful in carrying out the process of the invention. One suitable way of preparing such an aluminum soap is described in an application of Ralph P. Corlew and myself, Serial No. 26,038, filed June 11, 1935, upon which United States Patent No. 2,059,192 was granted. However, the exact manner of preparing the soap is not important.

In carrying out the process of the present invention the metallic soap is caused to react with the theoretical quantity of caustic soda, preferably in the form of a 32° Bé. aqueous solution, thereby forming the corresponding soda soap which serves as the emulsifying agent while the hydroxide of the metal is precipitated in a finely divided or colloidal condition which is intimately dispersed through the mixture and serves as a stabilizing agent. In one particularly advantageous form of the process of the invention the metallic soap, for example oil-soluble aluminum soap of wax acids, is first dissolved in the desired amount of molten asphalt. Caustic soda in the form of an aqueous solution is then gradually added, in an amount just sufficient to convert the metallic soap to the sodium soap, while actively stirring the mixture. In this form of the process the metallic hydroxide in a finely divided or colloidal condition is formed as a precipitate in situ. An exceedingly intimate and uniform dispersion of the stabilizing agent throughout the emulsion, which promotes the stability of the emulsion, is thus obtained.

Care should be taken that the ratio of asphalt to emulsifying agent is not so great as to unfavorably affect the stability of the dispersion of the asphalt in the water. This ratio will vary to some extent but in general the ratio (by weight) of asphalt to soap should not exceed about 3 to 1.

The process of the invention is applicable to asphalts generally and may be satisfactorily employed in preparing emulsions of asphalt derived from petroleum residuals of Mexican origin as well as those derived from California, Venezuela or other asphalt base crudes by steam distillation. The following specific examples will further illustrate methods of carrying out the improved process of the invention and the improved product thereby produced.

Example I 11.60 parts (by weight) of an aluminum wax acids soap, made by oxidizing 130° F. melting point paraffin wax, having a saponification value of 171.1 and containing 3.58% of metallic aluminum in chemical combination, are heated to 130° F. and converted to the sodium soap and to aluminum hydroxide by slowly adding 1.40 parts of sodium hydroxide in the form of an aqueous solution of 30° Bé. The mixture is actively stirred during the addition and stirring is continued until conversion of the aluminum wax acids soap to the corresponding sodium soap has been obtained. From 3 to 5 parts of water may be added during the mixing to keep the mass thinned down to the desired fluidity. Then 31.4 parts of Mexican steam-refined asphalt having a penetration of 150 at 77° F. are slowly added at a temperature approximating 130–150° F. while actively stirring the mixture. Mixing is advantageously carried out in a homogenizer or colloid mill. Stirring is continued at a temperature of about 130–150° F. until the asphalt is well incorporated into the mass, after which water is added, slowly at first and then rapidly while continuing the stirring, until the total water content of the emulsion, including the water contained in the caustic soda solution, is brought to 55.6 parts. Additional water may be added however if greater fluidity is desired.

An emulsion produced in accordance with the foregoing example was found to be homogeneous after standing a week at room temperature, and it was stable after applying the three minutes A. S. T. M. drenched stone test. This test indicates the high storage stability of the emulsions of my invention. Upon hand-mixing it with 94–95% of ¼″–¾″ mesh dried hard limestone for several minutes on a flat surface the mixture set within ½ hour coating the stone with a uniform film of adhesive de-emulsified asphalt. This test shows the rapid-breaking characteristic of this emulsion.

The composition of the emulsion produced in the manner above described is as follows:

| | Parts by weight |
|---|---|
| Sodium soap of wax acids | 12.00 |
| Aluminum hydroxide | 1.00 |
| Water (total) | 55.60 |
| Asphalt | 31.40 |
| | 100.00 |

*Example II*

35.53 parts of molten steam-refined Mexican asphalt having a penetration of 150 at 77° F. are slowly added to 13.06 parts of aluminum soap, prepared from wax acids, having a saponification value of 171.0. The mixture is actively stirred as the asphalt is added and a temperature approximating 130–150° F. is maintained while continuing the stirring until a thoroughly homogeneous solution of the aluminum soap in the asphalt is obtained. Advantageously, the aluminum soap, which is oil soluble, may be incorporated into the asphalt by agitation in a homogenizer or colloid mill. After further agitation for about ½ hour, sodium hydroxide, in an amount just sufficient to convert the aluminum soap to the corresponding sodium soap, is slowly added while continuing the agitation and maintaining a temperature of approximately 130–150° F. The sodium hydroxide advantageously is added in the form of an aqueous solution of approximately 30 Bé. and 1.62 parts of the sodium hydroxide are required to effect the conversion of the aluminum soap to the corresponding sodium soap. The sodium hydroxide is added at a rate such that its addition requires about 1 hour. Then, while maintaining a temperature of about 150° F. stirring is continued until complete conversion of the aluminum soap to the sodium soap is obtained. As the reaction proceeds aluminum hydroxide is precipitated in situ in a finely divided colloidal form. A small amount of water, 5 to 10 parts for example, is gradually added in order to maintain the mass at a consistency that will permit it to be readily worked. Then additional water is added until the total water content of the mass, including the water contained in the sodium hydroxide solution, is 49.79 parts.

An emulsion prepared as above described was found to pass the three minutes A. S. T. M. drenched stone test indicating good stability. It was capable of dilution with water in all proportions and did not segregate on standing 7 days at room temperature. A mixture consisting of 500 grams of ¼–¾″ mesh dried limestone and 5–6% of this emulsion hand-mixed with a trowel on a flat surface, broke in about ½ to ¾ hour and deposited a homogeneous adhesive layer of de-emulsified asphalt on the stone.

The composition of the emulsion prepared as above described was as follows:

| | Parts by weight |
|---|---|
| Sodium soap of wax acids | 13.63 |
| Aluminum hydroxide | 1.05 |
| Water (total) | 49.79 |
| Asphalt | 35.53 |
| | 100.00 |

The most desirable proportions of the various components of emulsions prepared in accordance with the process of the invention will vary to some extent depending upon whether a stiff or fluid emulsion is desired. A very stiff emulsion having the following composition may be prepared by the procedure above described:

| | Parts by weight |
|---|---|
| Sodium wax acids soap | 25.02 |
| Aluminum hydroxide | 2.18 |
| Water (total) | 14.80 |
| Asphalt (150 penetration at 770° F.) | 58.00 |
| | 100.00 |

While such an emulsion is very stiff it is stable and will remain stable when diluted with water to substantially any desired degree of fluidity.

I claim:

1. A stable quick-breaking asphalt emulsion miscible with water, comprising asphalt dispersed in an aqueous medium, a sodium wax acids soap, and a minor proportion of finely divided aluminum hydroxide, the ratio of asphalt to soap not exceeding about 3 to 1 by weight.

2. In a process for producing stable asphalt emulsions miscible with water, the improvement comprising reacting a wax acids soap of a metal selected from the group consisting of aluminum, copper, iron and lead, with sodium hydroxide and admixing the resulting reaction products with the asphalt to be emulsified while maintaining the asphalt at an elevated temperature and subjecting the mixture to vigorous agitation.

3. In a process for producing stable asphalt emulsions, the improvement comprising reacting an aluminum wax acids soap with an aqueous solution of sodium hydroxide and admixing the resulting reaction products with the asphalt to be emulsified while maintaining the asphalt at an elevated temperature and subjecting the mixture to vigorous agitation.

4. In a process for producing stable asphalt emulsions, the improvement comprising admixing a wax acids soap of a metal selected from the group consisting of aluminum, copper, iron and lead, with the asphalt to be emulsified while maintaining the asphalt at an elevated temperature and subjecting the mixture to vigorous agitation, and thereafter adding an aqueous solution of sodium hydroxide to the mixture while continuing to maintain the mixture at an elevated temperature and to subject the mixture to vigorous agitation.

5. In a process for producing stable asphalt emulsions, the improvement comprising admixing the asphalt to be emulsified with an aluminum wax acids soap while maintaining the asphalt at an elevated temperature and subjecting the mixture to vigorous agitation, and thereafter adding an aqueous solution of sodium hydroxide to the mixture while continuing to maintain the mixture at an elevated temperature and to subject the mixture to vigorous agitation.

6. A stable quick-breaking asphalt emulsion miscible with water, comprising asphalt dispersed in an aqueous medium, a sodium wax acids soap, and a minor proportion of finely divided aluminum hydroxide, the ratio of asphalt to soap not exceeding about 3:1 by weight, the soap and the precipitated aluminum hydroxide being formed in situ in the emulsion by the reaction between sodium hydroxide and an aluminum wax acids soap.

EDWIN J. BARTH.